US010009217B2

(12) United States Patent
Sharma et al.

(10) Patent No.: US 10,009,217 B2
(45) Date of Patent: Jun. 26, 2018

(54) FAULT TOLERANT LEVEL 2 CHANNEL SELECTION

(71) Applicant: Cisco Technology, Inc., San Jose, CA (US)

(72) Inventors: Samar Sharma, San Jose, CA (US); Avni Baveja, San Jose, CA (US); Ashish Purushottam Attarde, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 50 days.

(21) Appl. No.: 15/185,074

(22) Filed: Jun. 17, 2016

(65) Prior Publication Data
US 2017/0118069 A1    Apr. 27, 2017

Related U.S. Application Data

(60) Provisional application No. 62/247,058, filed on Oct. 27, 2015.

(51) Int. Cl.
G01R 31/08 (2006.01)
H04L 12/24 (2006.01)
H04L 12/26 (2006.01)

(52) U.S. Cl.
CPC ...... H04L 41/0668 (2013.01); H04L 41/0681 (2013.01); H04L 43/0811 (2013.01)

(58) Field of Classification Search
CPC ................................. H04L 12/24; H04L 12/26
USPC .................................................. 370/252-466
See application file for complete search history.

(56) References Cited

U.S. PATENT DOCUMENTS

| 6,683,869 B1* | 1/2004 | Pierson, Jr. | H04L 49/25 370/351 |
| 2001/0030942 A1* | 10/2001 | Suzuki | H04L 49/101 370/228 |
| 2013/0329547 A1* | 12/2013 | Takase | H04L 41/0654 370/220 |

* cited by examiner

Primary Examiner — Iqbal Zaidi
(74) Attorney, Agent, or Firm — Merchant & Gould P.C.

(57) ABSTRACT

A method for setting up standby links on a link failure may be provided. The method comprises for a set of N link ports and M standby link ports, where N and M are integers and N is not equal to M, performing the following functions. Determining the status of a link from a first link port of the N ports. After the link from the first link port has failed, determining when a standby link port from the M standby link ports has been assigned to the first link port of the N ports. After the standby link port has been assigned, determining the health of the standby link port. After the standby link port has been assigned and is healthy, redirecting traffic from the first link port to the standby link port.

8 Claims, 7 Drawing Sheets

FAULT TOLERANT LEVEL 2 CHANNEL SELECTION

RELATED APPLICATION

Under provisions of 35 U.S.C. § 119(e), Applicant claims the benefit of U.S. Provisional Application No. 62/247,058 filed Oct. 27, 2015, which is incorporated herein by reference in its entirety.

TECHNICAL FIELD

The present disclosure relates generally to computer networking, and more particularly, though not exclusively, to a system and method for fault-tolerant Level 2 channel selection.

BACKGROUND

Certain network switches are equipped with "port channel" capabilities, such as those described in IEEE standard 802.3ad. In an example, a network switch may use port channels to load balance packets to service appliances, via an algorithm such as hardware hashing. For example, the layer 2 (MAC) address of an incoming packet may be hashed with an algorithm such as MODULO, where the MODULO value is selected as the number of physical ports in a logical port bundle. Thus, where 4 ports are supported, for example, incoming Level 2 ("L2") addresses may be hashed with MODULO 4, and each packet is then assigned to a port in the logical port bundle. Network appliances may be attached to each physical port, providing duplicate functionality.

Failures can be an issue with devices attached to network switches. These failures can be the result of, for example, failures in the physical link, failures in configuration, or failures in applications. When failures occur, the integrity of the system and quality of the system is compromised.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1A:
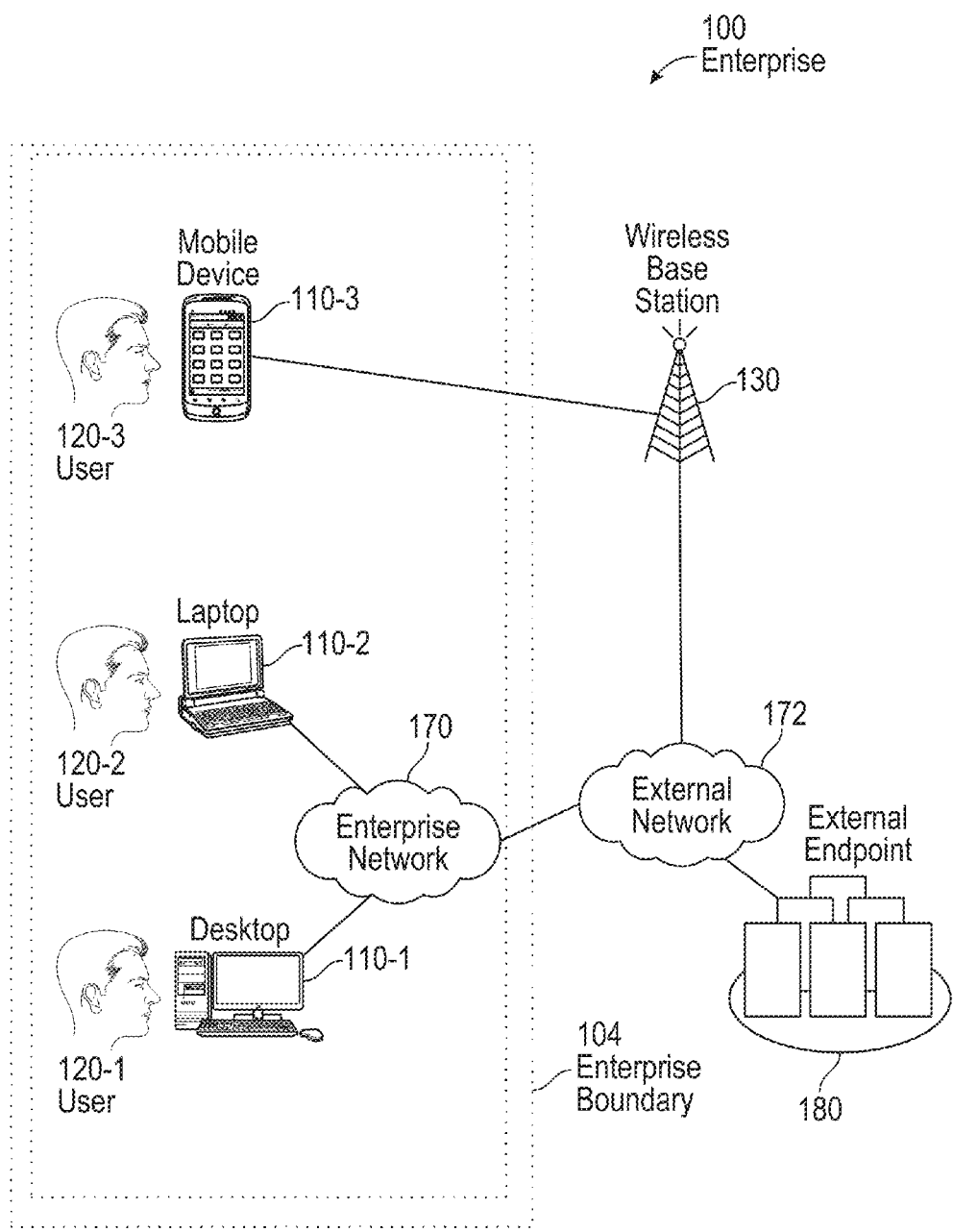
FIGS. 1A and 1B are block diagram of a network architecture.

A method for setting up standby links on a link failure may be provided. The method comprises for a set of N link ports and M standby link ports, where N and M are integers and N is not equal to M, performing the following functions. Determining the status of a link from a first link port of the N ports. After the link from the first link port has failed, determining when a standby link port from the M standby link ports has been assigned to the first link port of the N ports. After the standby link port has been assigned, determining the health of the standby link port. After the standby link port has been assigned and is healthy, redirecting traffic from the first link port to the standby link port.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Layer 2 (L2) switch channeling provides some or all of the advantages of port channels or EtherChannel, along with additional flexibility. It should be noted that L2 is used as an illustrative, non-limiting example of the system and methods disclosed herein, and that the methods may be adapted, where appropriate, to other layers within the traditional OSI "stack." In an embodiment, a switch may be configured to perform L2 channeling. In this case, a network may be arranged to provide one or more service functions that are to be performed before traffic can be forwarded to a workload server providing a customer or end user-facing function.

To provide just one non-limiting example, an enterprise may provide a web server, which serves a dynamic web page to end users. However, before traffic is provided to the workload cluster providing the actual website, traffic should be cleared through a firewall. Because the volume of traffic is large, having only a single firewall appliance may create an unacceptable bottleneck. Thus, the network switch may require an ability to perform load balancing-like operation for the service function. Certain embodiments of port channel and EtherChannel or similar may provide a load balancing-like operation.

Advantageously, the system, apparatus, and methods of the present specification provide L2 channel selection that provides for quick failure detection and provides N:M redundancy in the channels, where N denotes the active channels and M denotes the standby channels. The system probes the channels at a frequency configured by a user and has standby assignments designated by the user. Upon the probe detecting a failure, the system will quickly switch a channel to the designated standby channel. Probe frequency and retry counts may all be user configurable.

A system and method for high speed L2 channel selection will now be described with more particular reference to the attached figures. It should be noted that throughout the figures, certain reference numerals may be repeated to indicate that a particular device or block is wholly or substantially consistent across the figures. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1A is a network-level diagram of a networked enterprise 100 according to one or more examples of the present Specification. Enterprise 100 may be any suitable enterprise, including a business, agency, nonprofit organization, school, church, family, or personal network, by way of non-limiting example. In the example of FIG. 1A, a plurality of users 120 operate a plurality of endpoints or client devices 110. Specifically, user 120-1 operates desktop computer 110-1. User 120-2 operates laptop computer 110-2. And user 120-3 operates mobile device 110-3.

Each computing device may include an appropriate operating system, such as Microsoft Windows, Linux, Android, Mac OSX, Unix, or similar. Some of the foregoing may be more often used on one type of device than another. For example, desktop computer 110-1, which in one embodiment may be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are for illustration only, and are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of non-limiting example. Enterprise network 170 may also include one or more servers, firewalls, routers, switches, security appliances, antivirus servers, or other useful network devices, along with appropriate software. In this illustration, enterprise network 170 is shown as a single network for simplicity, but in some embodiments, enterprise network 170 may include a more complex structure, such as one or more enterprise intranets connected to the Internet. Enterprise network 170 may also provide access to an external network 172, such as the Internet. External network 172 may similarly be any suitable type of network.

Networked enterprise 100 may encounter a variety of "network objects" on the network. A network object may be any object that operates on, interacts with, or is conveyed via enterprise network 170. In one example, objects may be broadly divided into hardware objects, including any physical device that communicates with or operates via the network, software objects, and other logical objects.

Networked enterprise 100 may communicate across enterprise boundary 104 with external network 172. Enterprise boundary 104 may represent a physical, logical, or other boundary. External network 172 may include, for example, websites, servers, network protocols, and other network-based services. In one example, network objects on external network 172 include a wireless base station 130, an application repository 182, an external endpoint 180, and an attacker 190. It may be a goal for enterprise 100 to provide access to desirable services, such as application repository 182 and external endpoint 180, while excluding malicious objects such as attacker 190.

Wireless base station 130 may provide mobile network services to one or more mobile devices 110, both within and without enterprise boundary 104.

Application repository 160 may represent a Windows or Apple "app store" or update service, a Unix-like repository or ports collection, or other network service providing users 120 the ability to interactively or automatically download and install applications, patches, or other software on client devices 110.

In some cases, networked enterprise 100 may provide policy directives that restrict the types of applications that can be installed from application repository 160. Thus, application repository 160 may include software that is not malware, but that is nevertheless against policy. For example, some enterprises restrict installation of entertainment software like media players and games. Thus, even a secure media player or game may be unsuitable for an enterprise computer. A security administrator may be responsible for distributing a computing policy consistent with such restrictions and enforcing it on client devices 110.

Figure 1B:
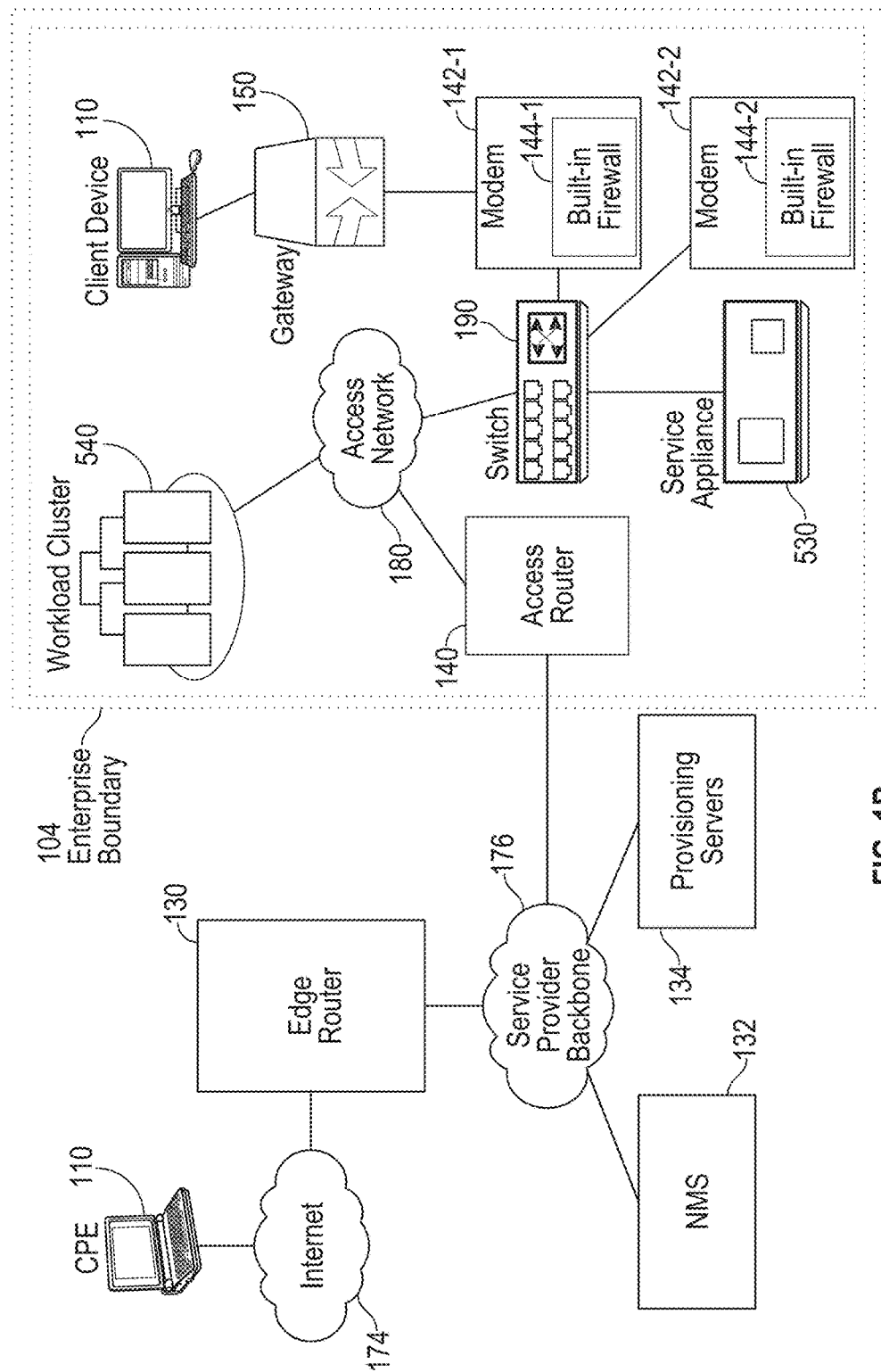

FIG. 1B is a simplified block diagram of a network that may include, for example, enterprise network 170 and external network 172. FIG. 1B includes provisioning servers 134, a network management system (NMS) server 132, an Internet 174, an edge router 130, a service provider backbone 176, an access router 140, an access network 180, a plurality of modems 142-1, 142-2, 142-3, a gateway 150, and customer premises equipment (CPE) such as a client device 110.

In some embodiments, a firewall may be provided in one or more gateways 150, CPE 110, and modems 142, by way of non-limiting example. Those with skill in the art will recognize that although firewalls 144 are shown in each of the foregoing, a firewall need not be included for the devices to function. Firewall 144 may also be, in some embodiments, a separate network device.

In general terms, the network can be configured to communicate with modems 142 to classify traffic. More specifically, access router 140 and modems 142 can use access control lists (ACLs) to identify important data. Note that while in the examples discussed herein, an ACL is used as a way to sort or to classify traffic, other methods may equally be used, such as a data over cable service interfaces specification (DOCSIS) classifier, a telecommunications access method (TCAM), etc.

The following foundational information may be viewed as a basis from which the present disclosure may be properly explained. Such information is offered earnestly for purposes of discussion only and, accordingly, should not be construed in any way to limit the broad scope of the present disclosure. DOCSIS is a telecommunications standard that permits the addition of high-speed data transfer to an existing cable TV (CATV) system. DOCSIS is employed by many cable television operators to provide Internet access over existing hybrid fiber-coaxial (HFC) infrastructure. A DOCSIS architecture generally includes two primary components: a cable modem (CM) located at a customer premises (e.g., more generally represented as modem 142) and a cable modem termination system (CMTS) located at a CATV headend (e.g., more generally represented as access router 140). Cable systems supporting on-demand programming typically use a hybrid fiber-coaxial system. Fiber optic lines bring digital signals to nodes in the system, where they are converted into RF channels and modem signals on coaxial trunk lines.

To identify important data flows, an access router (e.g., access router 140) can be configured with upstream and downstream ACLs. Each ACL may include expressions to match traffic at OSI Layer 2, Layer 3, Layer 4, or any suitable combination thereof. For each modem (e.g., modem 26*a-c*) in communication with the access router, the access router can monitor the data rate of packets matching ACLs. In an embodiment, each modem can be provisioned with the same or different ACLs that may or may not contain entries from the ACLs in the access router. In another embodiment, each modem may be provisioned with the same ACLs. The ACLs can include packet matching parameters, rate thresholds, time thresholds, timers, etc.

Note that DOCSIS Packet Classifiers are functionally equivalent to ACLs in this context. In an embodiment, when implementing the ACLs, packets such as Address Resolution Protocol (ARP) packets can be identified based on parameters such as the target address. An ARP may be filtered based on parameters within the body of the ARP (e.g., a target hardware address). Other network elements performing network traffic shaping functions may also use the ACLs to identify important traffic.

The access router can be configured to monitor the aggregate data rate used by a cable modem and adjust downstream/upstream channel allocation accordingly. By consolidating traffic on fewer channels, the access router can make a tradeoff between traffic engineering efficiency and modem power consumption. This may be beneficial when the overall network usage is low. Likewise, each modem may request a smaller channel set based on information from a CPE (e.g., CPE 110) or an end user.

Applications running on a CPE can initiate two-way network communications in response to user interaction and autonomously generated events. Network management systems (e.g., provisioning servers 134, NMS server 132, etc.) can initiate two-way network communications to agent processes in the CPE. Two-way communications generally have unicast IP source and destination addresses. Often, network management systems repeatedly transmit certain types of information in structures called data carousels. Data carousels may be addressed to broadcast or multicast destinations. Data carousels usually convey information that is needed by the CPE, but that is unsuitable for storage in the CPE's persistent memory. For instance, if the CPE is a set-top box, system information and program guide information changes occasionally and this information would not be reliable when the set-top box activates after a significant time offline. Carousels deliver data with performance independent of the number of set-top boxes served. In addition, broadcast carousels can remain effective in some situations, where upstream communications are impaired.

Several element management and provisioning protocols may use downstream datagram delivery that terminate at the CPE. Some of these datagrams may be unsolicited by the CPE and do not result in any attempt to respond with an acknowledgement. Examples include conditional access Entitlement Management Messages and MPEG DSM-CC passthrough messages when the CPE is a set-top box.

The modem might need to maintain values in memory including IP addresses, configuration file settings, service identifier (SID) values, downstream service identifier (DSID) values, service agreement identifier (SAID), BPI+ state, etc. The modem can be configured to keep track of elapsed time. In one example, the modem may be free from having to maintain autonomous tracking of elapsed time during a low-power dissipation state, even though some set-top boxes support scheduled events.

In an embodiment, messages from the network to the modem or CPE can be used to communicate policies such as duty cycle, always-be-on time window, whether the downstream receiver should continue to listen for control messages, etc. Policies of direct interest to the access router may be indicated in extensions in REG-REQ, REG-REQ-MP, REG-RSP and REG-RSP-MP DOCSIS MAC Management messages. The modem and the access router can implement these policies only partially and, thus, may need to be discovered or negotiated. In another embodiment, the ranging operations of the modem may be reduced when coming out of a low-power state. For example, the access router may continue to offer station maintenance opportunities so that the modem can go directly to station maintenance and skip initial maintenance.

Turning to the example infrastructure associated with present disclosure, CPE 110 can be associated with devices, customers, or end users wishing to receive data or content in energy management system 10 via some network. The term 'customer premise equipment' is inclusive of devices used to initiate a communication, such as a receiver, a computer, a set-top box, an Internet radio device (IRD), a cell phone, a smart phone, a tablet, a personal digital assistant (PDA), a Google Android, an iPhone, and iPad, or any other device, component, element, or object capable of initiating voice, audio, video, media, or data exchanges. CPE 110 may also be inclusive of a suitable interface to the human user, such as a display, a keyboard, a touchpad, a remote control, or other terminal equipment. CPE 110 may also be any device that seeks to initiate a communication on behalf of another entity or element, such as a program, a database, or any other component, device, element, or object capable of initiating an exchange. Data, as used herein in this document, refers to any type of numeric, voice, video, media, or script data, or any type of source or object code, or any other suitable information in any appropriate format that may be communicated from one point to another.

Service provider backbone 176 and Internet 174 each represent a series of points or nodes of interconnected communication paths for receiving and transmitting packets of information that propagate through networks. Service provider backbone 176 and internet 174 each offer a communicative interface between sources and/or hosts, and may be any appropriate network. A network can comprise any number of hardware or software elements coupled to (and in communication with) each other through a communications medium.

In one particular instance, the architecture of the present disclosure can be associated with a service provider digital subscriber line (DSL) deployment. In other examples, the architecture of the present disclosure would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures, and DOCSIS cable television (CATV). The architecture of the present disclosure may include a configuration capable of transmission control protocol/internet protocol (TCP/IP) communications for the transmission and/or reception of packets in a network.

Access router 140 and modem 142 are network elements that can facilitate the networking activities discussed herein. As used herein in this specification, the term 'network element' is meant to encompass any of the aforementioned elements, as well as switches, cable boxes of any kind (including set-top boxes), CMTSs, CMs, gateways, bridges, load balancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, access router 140 and/or modem 142 include software to achieve (or to foster) the networking activities discussed herein. Additionally, each of these elements can have an internal structure (e.g., a processor, a memory element, etc.) to facilitate some of the operations described herein. In other embodiments, these networking activities may be executed externally to these elements, or included in some other network element to achieve the intended functionality. Alternatively, access router 140 and/or modem 142 may include software (or reciprocating software) that can coordinate with other network elements in order to achieve the networking activities described herein. In still other embodiments, one or several devices may include any suitable algorithms, hardware, software, components, modules, interfaces, or objects that facilitate the operations thereof.

The enterprise network also includes a service appliance 530 and a workload cluster 540. The service appliance 530 may provide a network service such as a firewall, deep packet inspection, antivirus scanning, load balancing, or any other suitable service, whether the service modifies incoming packets or simply inspects and passes incoming packets.

Workload cluster 540 may provide client-facing services, such as a website, web services, FTP, NTP, NFS, collaborative document services, or any other suitable service.

In cases where separate load balancing appliances are not provided, switch 190 may be tasked with load balancing traffic out to a plurality of service appliances. This may be accomplished via a method such as EtherPort, PortChannel, or L2 channeling in accordance with the teachings of this specification.

Figure 2:
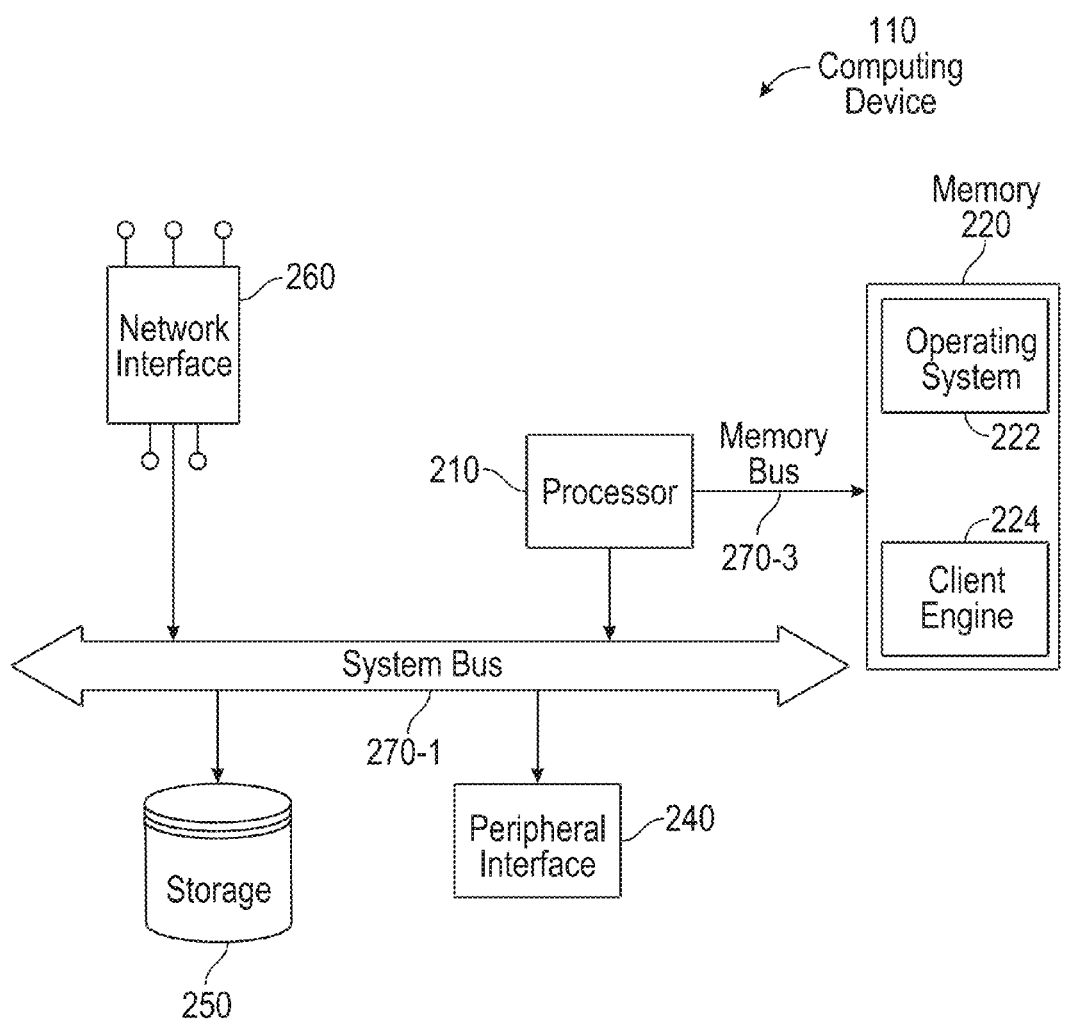
FIG. 2 is a block diagram of a client-class computing device, such as a customer-premises equipment (CPE) or endpoint device.

FIG. 2 is a block diagram of client device 200 according to one or more examples of the present specification. Computing device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

In certain embodiments, client devices 110 may all be examples of computing devices 200.

Computing device 200 includes a processor 210 connected to a memory 220, having stored therein executable instructions for providing an operating system 222 and at least software portions of a client engine 224. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of client engine 224. Many other configurations are also possible, and are intended to be encompassed within the broad scope of this specification.

Network interface 260 may be provided to communicatively couple client device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Client engine 224, in one example, is operable to carry out computer-implemented methods as described in this specification. Client engine 224 may include one or more tangible non-transitory computer-readable mediums having stored thereon executable instructions operable to instruct a processor to provide a client engine 224. As used throughout this specification, an "engine" includes any combination of one or more logic elements, of similar or dissimilar species, operable for and configured to perform one or more methods provided by the engine. Thus, client engine 224 may comprise one or more logic elements configured to provide methods as disclosed in this specification. In some cases, client engine 224 may include a special integrated circuit designed to carry out a method or a part thereof, and may also include software instructions operable to instruct a processor to perform the method. In some cases, client engine 224 may run as a "daemon" process. A "daemon" may include any program or series of executable instructions, whether implemented in hardware, software, firmware, or any combination thereof that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that client engine 224 may also include other hardware and software, including configuration files, registry entries, and interactive or user-mode software by way of non-limiting example.

In one example, client engine 224 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of client engine 224 to provide the desired method.

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of non-limiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

Figure 3:
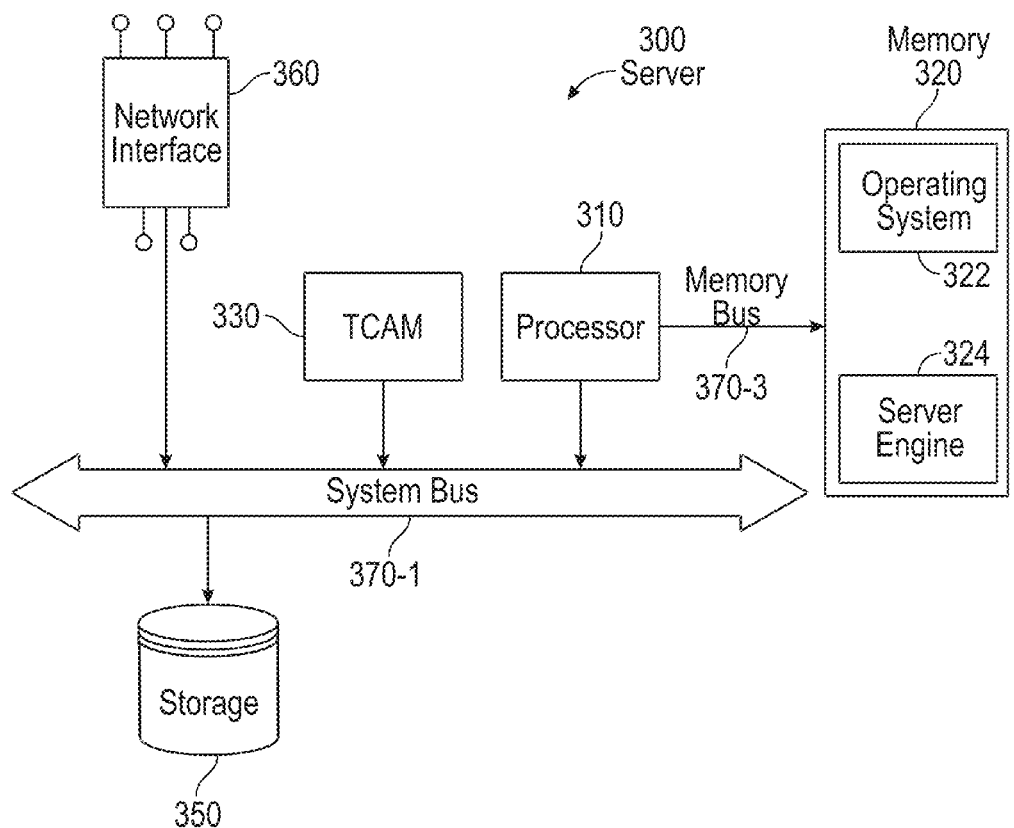
FIG. 3 is a block diagram of a server-class computing device.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein client device 200 provides certain localized tasks, while server 300 provides certain other centralized tasks. In contemporary practice, server 300 is more likely than client device 200 to be provided as a "headless" VM running on a computing cluster, or as a standalone appliance, though these configurations are not required.

In certain particular embodiments, switch 190 may be an embodiment of a server 300.

Server 300 includes a processor 310 connected to a memory 320, having stored therein executable instructions for providing an operating system 322 and at least software portions of a server engine 324. Other components of server 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of server engine 324.

Network interface 360 may be provided to communicatively couple server 140 to a wired or wireless network, and may include one or more logic elements as described in FIG. 2. In the case of switch 190, network interface 360 may include one or more ingress interfaces, and one or more egress interfaces. Ingress interfaces may be disposed to receive incoming traffic, such as from client devices, while egress interfaces may be disposed to send traffic to external devices, such as enterprise clients 110, workload clusters, or service appliances. As illustrated more fully in FIGS. 4 and 5, a first cluster of egress interfaces may be dedicated to a cluster of service appliances, and a second cluster of egress interfaces may be dedicated to a workload cluster.

Server engine 324 is an engine as described in FIG. 2 and, in one example, includes one or more logic elements operable to carry out computer-implemented methods as described in this specification. Software portions of server engine 324 may run as a daemon process.

Server engine 324 may include one or more non-transitory computer-readable mediums having stored thereon executable instructions operable to instruct a processor to provide a security engine. At an appropriate time, such as upon booting server 140 or upon a command from operating system 322 or a user 120 or security administrator 150, processor 310 may retrieve a copy of server engine 324 (or software portions thereof) from storage 350 and load it into memory 320. Processor 310 may then iteratively execute the instructions of server engine 324 to provide the desired method.

Server 300 may be provided with a ternary content-addressable memory (TCAM) 330 or other content-addressable memory (CAM). Unlike random access memory (RAM), in which the memory retrieves and returns the content stored at a supplied address, a CAM receives a "key," which may be a value in a table, and returns zero or more matches. If the key is found, the CAM returns the address(es) of the "hit," and may also return a value associated with the "hit." This provides a hardware equivalent of an "associative array." A TCAM 330 is a special case of a CAM in which one or more bits may have a "don't care" value, wherein for example 101X matches both 1011 and 1010.

Advantageously, TCAMs can be very fast, operating at hardware-like or near-hardware speeds, thus allowing a switch to operate at or near its full available hardware speed while looking up values in a TCAM.

In an embodiment, a server or switch may be configured to perform L2 channeling, using for example TCAM to provide a load balancing algorithm. In this case, a network may be arranged to provide one or more service functions that are to be performed before traffic can be forwarded to a workload server providing a customer or end user-facing function.

Peripheral interface 340 may be configured to interface with any auxiliary device that connects to server 300 but that is not necessarily a part of the core architecture of server 300. Peripherals may include, by way of non-limiting examples, any of the peripherals disclosed in FIG. 2. In some cases, server 300 may include fewer peripherals than client device 200, reflecting that it may be more focused on providing processing services rather than interfacing directly with users.

Figure 4:
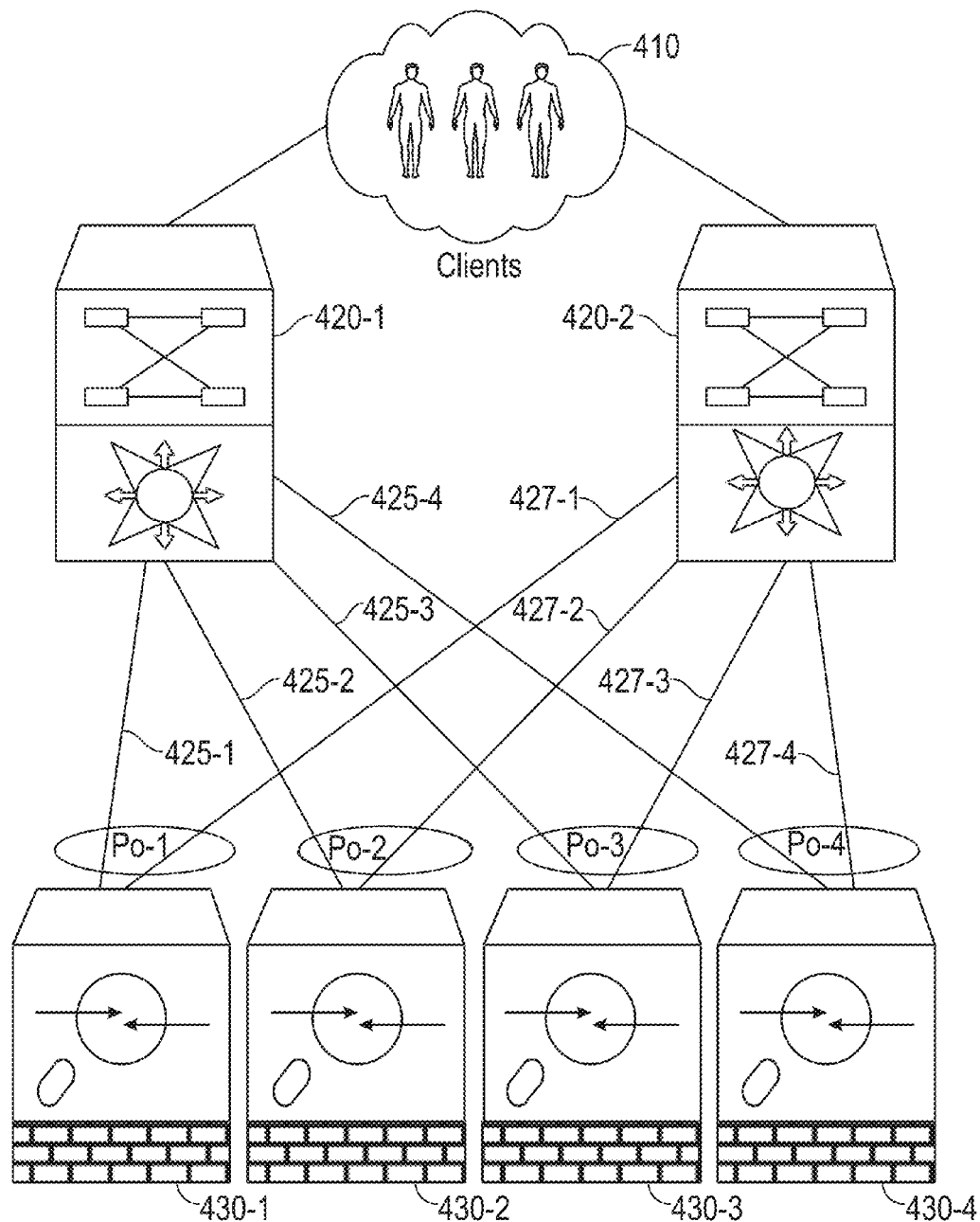
FIG. 4 illustrates traffic distribution in a system with virtual port channel technology.
Figure 5:
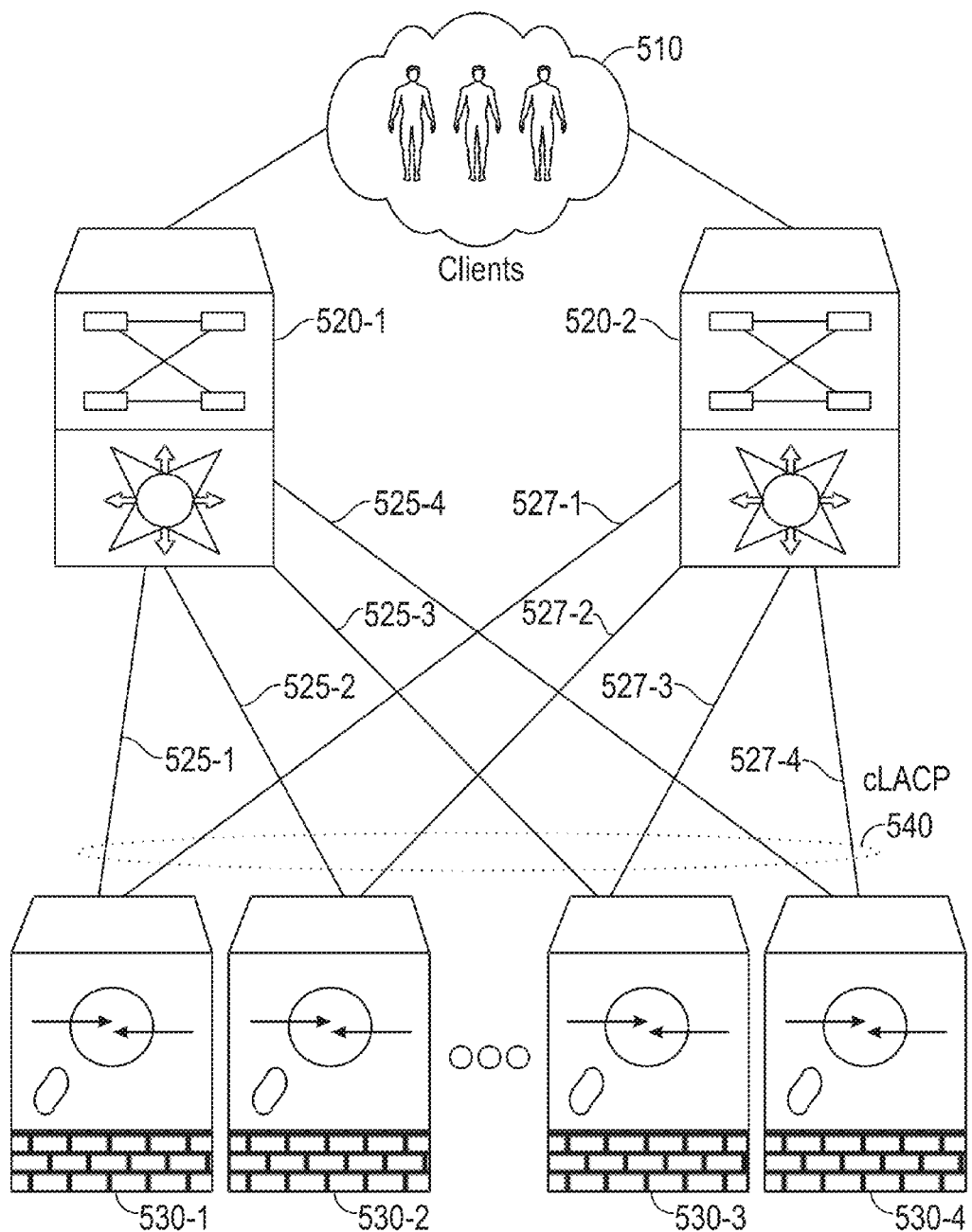
FIG. 5 illustrates traffic distribution in a system with virtual port channel technology where the switches are configured as logically a single device.

FIGS. 4 and 5 illustrate traffic distribution according to one or more examples of the present specification. FIG. 4 illustrates traffic distribution in a system with virtual port channel technology. Clients 410 are in communication with one or more switches 420-1 and 420-2. Each switch, in this exemplary embodiment, has four ports 425-1 through 425-4 for switch 420-1 and 427-1 through 427-4 for switch 420-2. The switches 420 may balance the load to server appliances 430. In this exemplary embodiments, port 1 of each switch (425-1 and 427-1) are linked to server appliance 430-1. Port 2 of each switch (425-2 and 427-2) are linked to server appliance 430-2. And so on through the fourth server appliance 430-4. Although only 2 switches 420 and four server appliances 430 are illustrated in this figured, those skilled in the art would appreciate that any number of switches and server appliances may be used.

Configuration of the switches 420 will be described in more detail following the description of FIG. 5. In the disclosed exemplary embodiments, the health of the links from the ports are probed at a user-determined or preset frequency. Probe frequency and retry counts may all be user configurable. When a link fails, the switch 420 will revert to using a standby link based on configuration of switch 420.

FIG. 5 illustrates traffic distribution in a system with virtual port channel technology where the switches are configured as logically a single device. Clients 510 are in communication with one or more switches 520-1 and 520-2. Each switch, in this exemplary embodiment, has four ports 425-1 through 425-4 for switch 520-1 and 527-1 through 527-4 for switch 520-2. The switches 520 may balance the load to server appliances 530. In this exemplary embodiments, port 1 of each switch (525-1 and 527-1) are linked to server appliance 530-1. Port 2 of each switch (525-2 and 527-2) are linked to server appliance 530-2. And so on through the fourth server appliance 530-4. Although only 2 switches 520 and four server appliances 530 are illustrated in this figured, those skilled in the art would appreciate that any number of switches and server appliances may be used. Communication to the server appliances 530 is via uses a logical link aggregation construct called the Cluster Link Aggregation Control Protocol ("cLACP") 540.

Configuration of the switches 520 will be described in more detail below. In the disclosed exemplary embodiments, the health of the links from the ports is probed at a user-determined or preset frequency. Probe frequency and retry counts may all be user configurable. When a link fails, the switch 520 will revert to using a standby link based on configuration of switch 520. In addition, because the switches 520 act as logically a single device, if a link of one of the switches 520 fails, then the corresponding link of the other switch 520 will also be set as failed. For example, if link 525-1 fails, then link 527-1 will also be set as failed.

There are several options for how to configure the standby links: as a 1:1 standby link assignment; as a 1:1 standby link assignment where standby is one of the active links within the port-group; or as an N:M standby link assignment, where N active links are part of a group and a pool of M standby links are established for the group. Example configurations are provided below:

Option 1 (1:1 Standby Link Assignment)
(port-group) # ethernet 1/1 standby ethernet 1/5
(port-group) # ethernet 1/2 standby ethernet 1/6
(port-group) # ethernet 1/3 standby ethernet 1/7
(port-group) # ethernet 1/4 standby ethernet 1/8

Option 2 (1:1 Standby Link Assignment, where Standby is One of Active Link within Port-Group)
(port-group) # ethernet 1/1 standby ethernet 1/2
(port-group) # ethernet 1/2 standby ethernet 1/4
(port-group) # ethernet 1/3 standby ethernet 1/1
(port-group) # ethernet 1/4 standby ethernet 1/3

Option 3 (N:M Standby Link Assignment, where 4 (N) Active Links are Part of Group and Pool of 3 (M) Standby Links for Group).
(port-group) # ethernet 1/1
(port-group) # ethernet 1/2
(port-group) # ethernet 1/3
(port-group) # ethernet 1/4
(port-group) # standby ethernet 1/5
(port-group-standby) # standby ethernet 1/6
(port-group-standby) # standby ethernet 1/7

Figure 6:
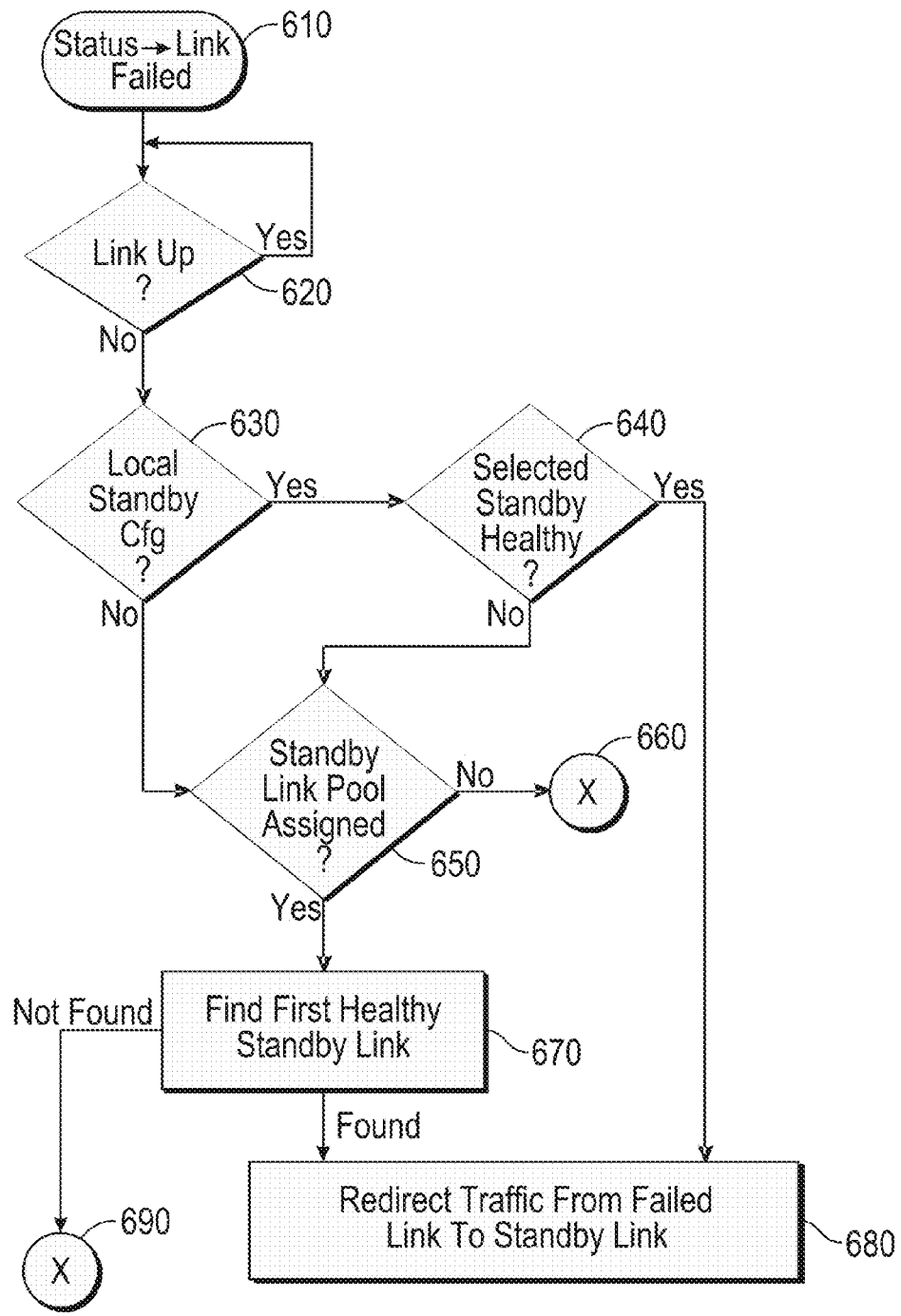
FIG. 6 illustrates a flow chart of the operation of an exemplary system.

FIG. 6 illustrates a flow chart of the operation of an exemplary system, such as illustrated in FIG. 4. A health probe tests the health of one or more links on a frequency determined by the person who configures the system or on a predetermined basis. If a health probe determines that a link 425 or 427 has failed (stage 610) a check is made to determine if the link has recovered (stage 620). If the link has not recovered, the switch 420 examines whether a local standby has been configured (stage 630). If a local standby has been configured, the switch 420 determines if the selected standby is healthy (stage 640). If it is healthy, traffic is redirected from the failed link to the standby link (stage 680).

If the switch 420 determines that local standby links are not configured (stage 630) or that standby links have been configured by the selected standby link is not healthy (stage 640), the switch 420 will check if a standby link pool has been assigned (stage 650). Such standby link pools may have been assigned as illustrated in option 3 above. If a standby link pool has not been assigned, the traffic will not be redirected (stage 660). However, if the switch 420 determines that the standby link pool has been assigned, then the switch 420 finds the first healthy standby link (stage 670) and traffic is redirected to that link (stage 680). If no health standby links are found, traffic will not be redirected (stage 690).

Operation for a topology such as shown in FIG. 5 operates in a similar fashion, with the distinction being that there may be one additional stage. When a port on a first switch in the logical single switch fails, the switches operate to fail the corresponding port in the other switch.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in the figures may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method, comprising:
    for a set of N link ports and M standby link ports, where N and M are integers and N is not equal to M;
    determining the status of a link from a first link port of the N ports, wherein determining the status of a link from a first link port of the N ports further comprises a user configuring a frequency of checking the status of the link and further wherein determining the status of a link from a first link port of the N ports further comprises a user configuring a retry count for checking the status of the link;
    after the link from the first link port has failed, determining when a standby link port from the M standby link ports has been assigned to the first link port of the N ports;
    after the standby link port has been assigned, determining the health of the standby link port, wherein the health of the standby link port is deemed unhealthy if there is a failure in a physical link, a configuration of the standby link port, or a failure in an application;
    when the standby link port is unhealthy, determining when a standby link pool has been assigned and finding a first healthy standby link within the standby link pool; and
    after the first healthy standby link is found, redirecting traffic from the first link port to the first healthy standby link.

2. The method of claim 1, further comprising after a standby link pool has not been assigned, not redirecting traffic from the first link port.

3. The method of claim 1, further comprising after a healthy standby link is not found, not redirecting traffic from the first link port.

4. A method, comprising:
    configuring a first port to probe within a group of N active ports, where N is an integer;
    comprising configuring a frequency to probe the first port;
    configuring a timeout time on probing of the first port;
    configuring a second port to be a standby port for the first port, where the standby port is one of M standby ports, where M is an integer not equal to N;
    configuring a third port to probe within the group of N active ports; and
    configuring a fourth and fifth ports of the M standby ports as a standby link pool assigned to the third port.

5. An apparatus comprising:
    a memory storage; and
    a processing unit coupled to the memory storage, wherein the processing unit is operative to:
        for a set of N link ports and M standby link ports, where N and M are integers and N is not equal to M:
            determine the status of a link from a first link port of the N ports,
            wherein a user determines a frequency of checking the status of the link;
            after the link from the first link port has failed, determine when a standby link port from the M standby link ports has been assigned to the first link port of the N ports;
            after the standby link port has been assigned, determine the health of the standby link port, wherein the health of the standby link port is deemed unhealthy if there is a failure in a physical link, a configuration of the standby link port, or a failure in an application;
            when the standby link port from the M standby link ports is unhealthy, determine when a standby link pool has been assigned;
            after the standby link pool has been assigned, find a first healthy standby link; and
            after the first healthy standby link is found, redirect traffic from the first link port to the first healthy standby link.

6. The apparatus of claim 5, wherein the processing unit is operative to, after a standby link pool has not been assigned, not redirecting traffic from the first link port.

7. The apparatus of claim 5, wherein the processing unit is operative to, after a healthy standby link is not found, not redirecting traffic from the first link port.

8. The method of claim 5, wherein the processing unit is operative to determine the status of a link from a first link port of the N ports further comprises a user configuring a retry count for checking the status of the link.

* * * * *